United States Patent [19]
Fujitani et al.

[11] Patent Number: 5,536,173
[45] Date of Patent: Jul. 16, 1996

[54] CHARGE CONNECTOR FOR ELECTRIC VEHICLES

[75] Inventors: Mitsuhiro Fujitani; Kazumoto Konda, both of Mie-ken; Yoshihiko Hotta; Daijiro Ichikawa, both of Saitama-ken, all of Japan

[73] Assignees: Sumitomo Wiring Systems, Ltd., Mie-Kin; Honda Giken Kogyo Kabushiki Kaisha, Tokyo, both of Japan

[21] Appl. No.: 277,587

[22] Filed: Jul. 20, 1994

[30] Foreign Application Priority Data

Jul. 22, 1993 [JP] Japan ................................ 5-202716

[51] Int. Cl.⁶ .................................................. H01R 33/00
[52] U.S. Cl. .............................. 439/34; 439/321; 439/490
[58] Field of Search ................................ 320/2; 439/188, 439/318, 321, 32, 34, 48, 135, 136, 142, 489, 490

[56] References Cited

U.S. PATENT DOCUMENTS

| | | | |
|---|---|---|---|
| 4,154,496 | 5/1979 | Gallagher | 439/321 |
| 4,553,000 | 11/1985 | Appleton | 200/50 B |
| 4,744,770 | 5/1988 | Drogo | 439/310 X |
| 5,350,312 | 9/1994 | Kuno et al. | 439/372 X |

FOREIGN PATENT DOCUMENTS

| | | |
|---|---|---|
| 60-24539 | 6/1985 | Japan . |
| 433908 | 11/1992 | Japan . |

*Primary Examiner*—Khiem Nguyen
*Attorney, Agent, or Firm*—Lyon & Lyon

[57] ABSTRACT

A connector including a locking mechanism to prevent a charge coupling from being broken when charging. A supply connector connected to a power source and a vehicle battery connector installed in an electric vehicle has a handle grip and a connector body attached to a distal end of the handle grip. The handle grip is provided in its interior with a lock mechanism which maintains and releases the coupling of the supply connector to the vehicle inlet and with a control which controls the lock mechanism. The control includes a detector for detecting a complete coupling of the supply connector to the vehicle connector. The control actuates the lock mechanism only when the detector detects the complete coupling and commencement of charging and releases the lock mechanism only when charging is stopped.

2 Claims, 5 Drawing Sheets

5,536,173

CHARGE CONNECTOR FOR ELECTRIC VEHICLES

BACKGROUND OF THE INVENTION

1. Field of the Invention

This invention relates to charge couplings for electric vehicles and more particularly to couplings for detachably coupling supply connectors to battery connectors installed in electric vehicles for charging thereof.

2. Statement of the Prior Art

Since charging of a battery is essential to an electric vehicle, a power source for charging should be readily connectable to a battery installed in the vehicle. Heretofore, a battery connector is provided in the electric vehicle while a supply connector is connected to the power source. The supply connector is detachably connected to the battery connector to charge the battery.

As charging an electric vehicle requires a relatively long time in comparison with supplying gasoline, an operator can not always stand ready for charging. Particularly, in the case that the charging is carried out at home, it is difficult to effect rapid charging at a high current. Consequently, charging may be carried out when a vehicle is parked at an owner's home overnight. In this case, the supply connector is fitted to the battery connector to commence charging and is maintained in the fitting position for a long time at a lower current.

However, such conventional supply connectors have not been provided with satisfactory locking mechanisms. For example, conventional supply connectors are easily detached from the battery connector during charging. Consequently, a person not aware of the state of charge of a vehicle may detach the supply connector when charging is incomplete. Even if a lock mechanism is provided on a supply connector, charging may be started with the lock not fully engaged, whereby the supply connector may be accidentally disconnected from the vehicle battery connector.

SUMMARY OF THE INVENTION

An object of the present invention is to provide a charging coupling for an electric vehicle, which can prevent a supply connector from being carelessly detached from a vehicle battery connector and prevent commencement of charging with the coupling not fully engaged.

In achieving the above object, a coupling for detachably fitting a supply connector to a vehicle battery connector to charge an electric vehicle in accordance with the present invention may comprise a lock mechanism for maintaining and releasing a coupling of the supply connector to the vehicle battery connector; and means for controlling the lock mechanism to actuate it only when charging is commenced and to release it only when charging is stopped.

The controlling means may be provided with means for detecting a complete coupling of the supply connector to the vehicle connector. The controlling means can be arranged to actuate the lock mechanism only when the detecting means detect the complete coupling and commencement of charging and to release the lock mechanism only when charging is stopped.

The lock mechanism may include means for detecting an operating state of the lock mechanism and means for indicating an operating state of the lock mechanism.

The lock mechanism would be actuated by the lock control means when charging is commenced after the supply connector is fitted to the vehicle connector. Consequently, the supply connector may be maintained in the coupled position in the vehicle connector, thereby preventing the supply connector from being disconnected.

The lock mechanism would be actuated after charging commences and complete fitting of the supply connector to the vehicle is detected.

A user can easily detect an abnormal operation of the lock mechanism by way of an indicator.

According to one aspect of the present invention, the supply connector cannot be disconnected from the vehicle battery connector carelessly during charging. Further, charging would not be interrupted or slowed since the supply connector cannot be detached from the vehicle battery connector. According to another aspect of the present invention, the lock mechanism is actuated after the supply connector is completely coupled with the vehicle battery connector, thereby preventing the supply connector from being locked in position without an electrical coupling. In addition, the lock indicator can prevent charging under abnormal operation of the lock mechanism.

DETAILED DESCRIPTION OF THE PREFERRED EMBODIMENTS

Figure 1:
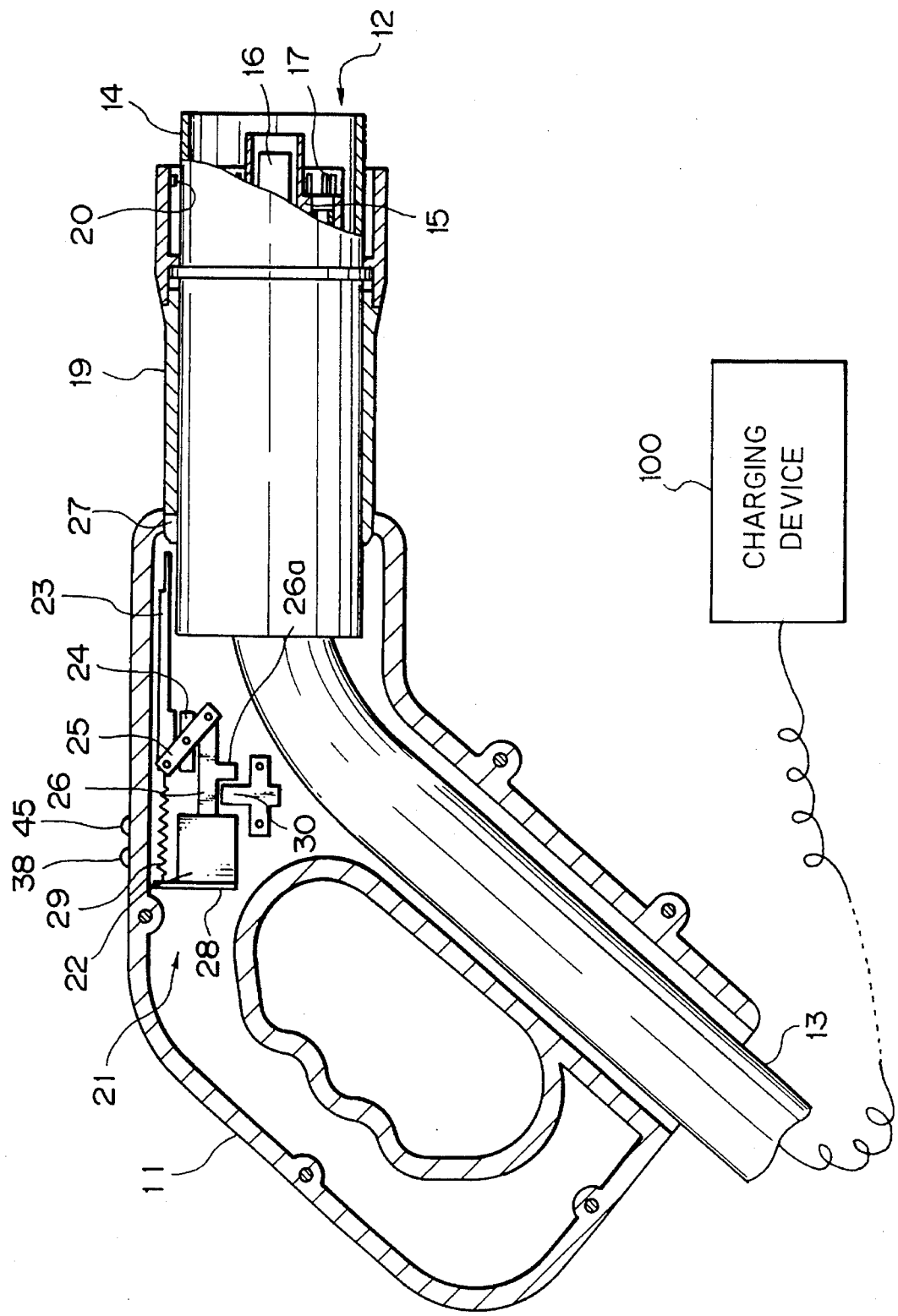
FIG. 1 is a longitudinal sectional view of an embodiment of a coupling for charging an electric vehicle in accordance with the present invention.

An embodiment of a coupling for detachably coupling a supply connector 1 to a vehicle battery connector 2 to charge an electric vehicle in accordance with the present invention will be explained below by referring to the drawings. As shown in FIG. 1, the supply connector 1 has a rectangular handle grip 11 and a cylindrical connector body 12 attached to a distal end of the handle grip 11 and is generally formed into a gun type shape. A charge cable 13 extends from a lower end of the handle grip 11 and is connected to a charging device 100, for example. The connector body 12 includes a cylindrical inner casing 14, an insulator 15, and a pair of charge terminals 16 (only one of them is shown) extending through an insulator 15 near a front, open end. When the supply connector is fitted to the vehicle battery connector 2 (not shown), the charge terminals 16 are electrically connected to terminals in the vehicle connector 2.

Also, the insulator 15 is provided in its interior with, for example, two pairs of connection detecting terminals 17, 17. When the supply connector 1 is fitted to the vehicle connector 2, the connection detecting terminals are conducted by a shorting terminal 18 (see FIG. 4).

Figure 3:
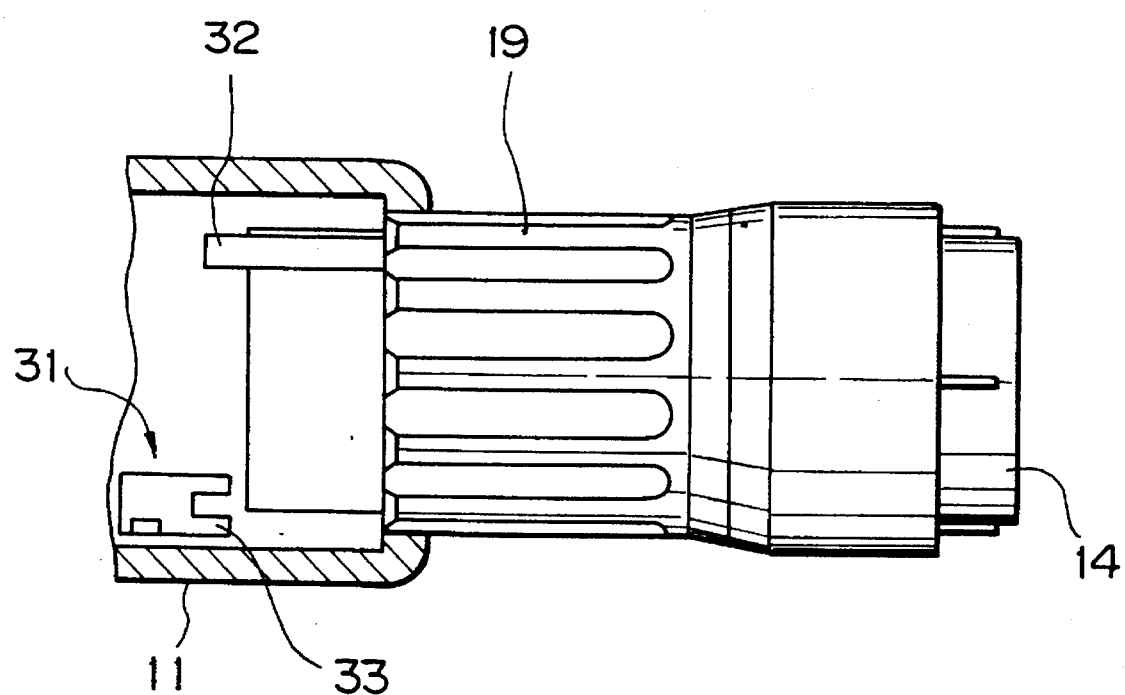
FIG. 3 is a plan view of the embodiment of FIG. 1, illustrating a part broken away.

As shown in FIGS. 1 and 3, a cylindrical sleeve 19 is mounted on an outer periphery of the inner casing 14 of the connector body 12 so that the sleeve cannot slide axially on but can rotate peripherally on the casing 14. The sleeve 19 is shorter than the inner casing 14. The sleeve 19 has an enlarged end which engages with an outer periphery of a guide cylinder (not shown) of the vehicle connector 2 when the supply connector 1 is fitted to the vehicle.

The sleeve 19 is provided on its inner periphery with a boss 20 (FIG. 1) which projects inwardly and is adapted to engage with a spiral groove formed in the guide cylinder (not shown) of the vehicle connector 2.

When the distal end of the supply connector 1 abuts on the vehicle connector 2 and the sleeve 19 is turned, the boss 20 moves in the spiral groove, thereby axially displacing the supply connector 1 as well as the sleeve 19 toward the vehicle connector 2. When the sleeve 19 is fully turned to displace the boss 20 to an end of the spiral groove, the connector body 12 is completely fitted to the vehicle battery connector 2. The connector body 12 can be detached from the vehicle by turning the sleeve 19 in a reverse direction.

Figure 2:
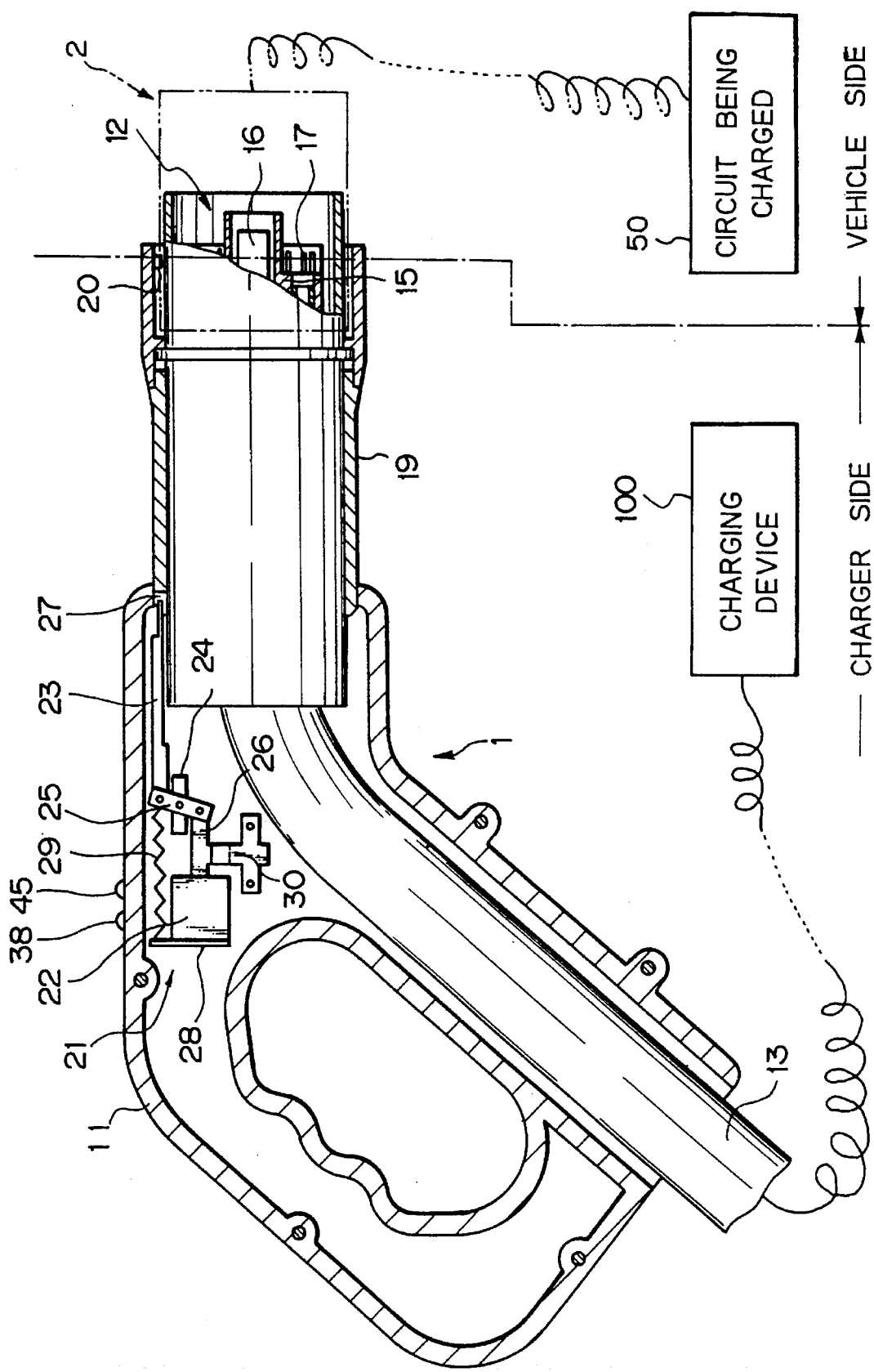
FIG. 2 is a longitudinal sectional view similar to FIG. 1, illustrating the coupling in a locked position.

The supply connector 1 is provided in its interior and near the proximal end of the sleeve 19 with a lock mechanism 21. The lock mechanism 21, as shown in FIGS. 1 and 2, includes a solenoid 22 and a lock rod 23 to be driven by the solenoid 22. The lock rod 23 can move axially or in right and left directions as shown in the drawings. The proximal end of the lock rod 23 is coupled to an end of a connecting arm 25 rotatably supported on a base 24 of the handle grip 11. The other end of the connecting arm 25 is coupled to a plunger rod 26 of the solenoid 22. When the solenoid 22 is energized to draw the plunger rod 26 to the left in the drawings, the lock rod 23 is advanced to the right in the drawings through the connecting arm 25.

The sleeve 19 is provided in its rear end with a U-shaped notch 27 which opens rearwardly. If the solenoid 22 is energized when the sleeve 19 is rotated so that the notch 27 faces the lock rod 23, the distal end of the lock rod 23 enters into the notch 27 to lock the sleeve 19. A tension spring 29 is connected to a rear end of the lock rod 23 and to a support plate 28 secured to the handle grip 11 to bias the lock rod 23 toward a direction in which the lock rod 23 is extracted from the notch 27 (to the left in the drawings).

The plunger rod 26 is provided on its middle portion with a douser 26a. A photointerruptor 30 which constitutes lock action detecting means together with the douser 26a is disposed within a displacing area of the douser in the handle grip 11. When the solenoid 22 is energized to draw the plunger rod 26 to a position in which the lock rod 23 locks the sleeve 19, the douser 26a enters into the photointerruptor 30 to exert a switching action.

On the other hand, the handle grip 11 is provided in its interior with coupling detecting means 31 shown in FIG. 3. As shown in FIG. 3, the coupling detecting means 31 include a detecting piece 32 projected from the rear end of the sleeve 19 and a photointerruptor 33 secured to the handle grip 11 within a rotary area of the detecting piece 32. The photointerruptor 33 serves to detect completion of the coupling, namely a complete coupling of the sleeve 19 relative to the vehicle connector 2. When the sleeve 19 is turned to the complete coupling position to couple the supply connector 1 to the vehicle connector, the distal end of the detecting piece 32 enters into the photointerruptor 33 to exert a switching action.

Figure 4:
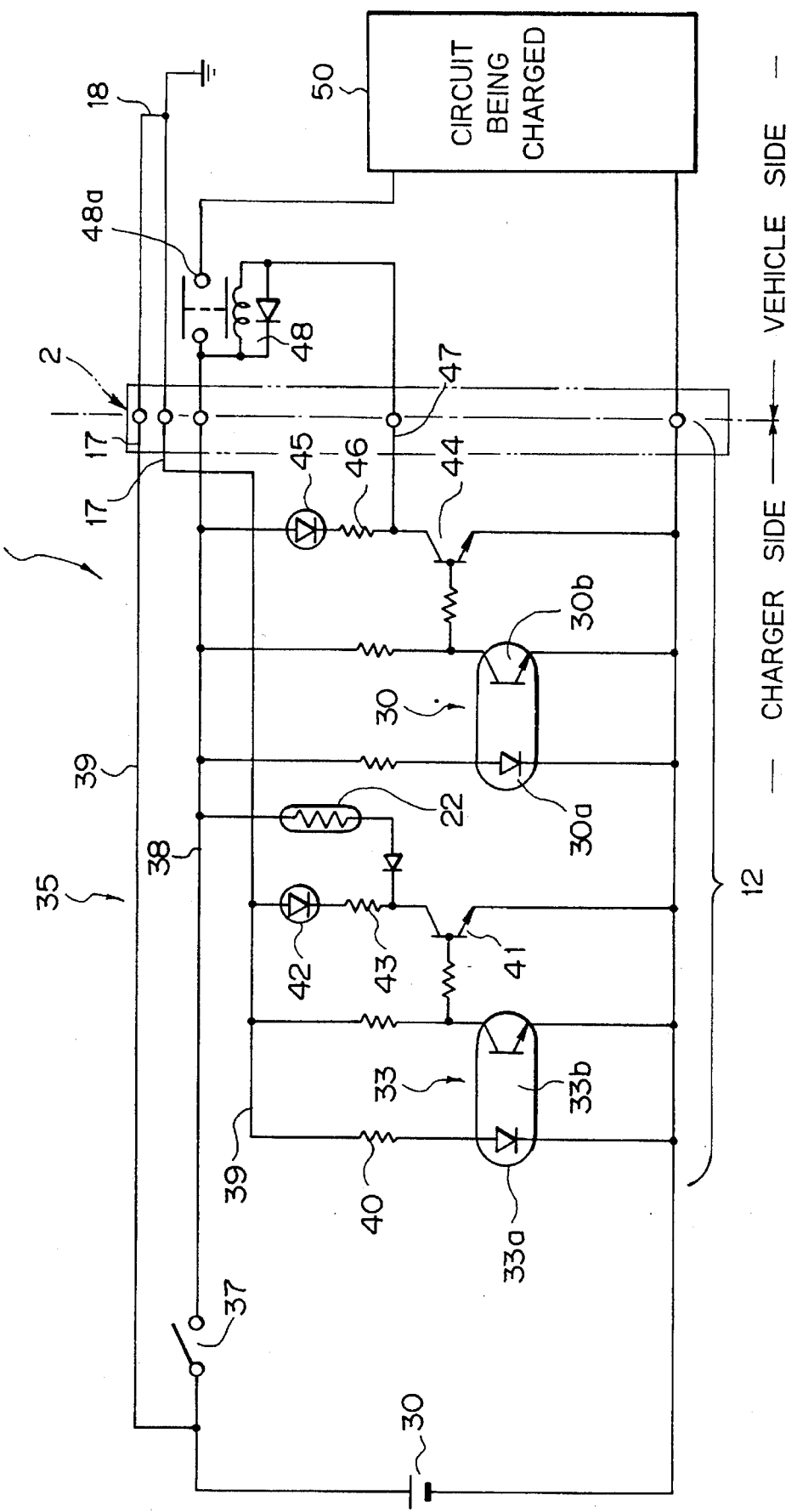
FIG. 4 is a circuit diagram of a lock control circuit of the coupling.

As shown in FIG. 4, a lock control circuit 35 is provided in the handle grip 11 as means for controlling the lock mechanism 21. A power source 36 for charging and a charge switch 37 in the circuit 35 are arranged in a charging device 100 (FIG. 1) to which the supply connector 1 is connected. A charge line 38 is introduced from the charge power source 36 through the charge switch 37 into the connector body 12.

A control power source line 39 is introduced from the charge power source 36 through a branched point from an input of the switch 37 into the connector body 12. The control power source line 39 is connected to one of the connection detecting terminals 17, 17 described above in the connector body 12. A pair of connection detecting terminals 17, 17 are shorted by the shorting terminal 18 in the vehicle connector 2, when the supply connector 1 is fitted to the vehicle connector 2. Upon fitting the supply connector 1 to the vehicle connector 2, the control power source line 39 is drawn into the connector body 12 through the other connection detecting terminal 17.

In the connector body 12, the control power source line 39 is connected through a protective resistor 40 to a light emitting diode 33a of the photointerruptor 33 for detecting the completion of the coupling. When the supply connector 1 is coupled to the vehicle connector 2, the light emitting diode 33a lights. A phototransistor 33b of the photointerruptor 33 is connected to an output transistor 41 which drives the solenoid 22. When light from the light emitting diode 33a is interrupted by the piece 32 (FIG. 3) to turn the phototransistor 33b to OFF, the output transistor 41 is turned to ON. When the transistor 41 is turned to ON, the solenoid 22 is conducted under a condition in which the charge switch 37 is turned to ON.

A lamp 42, which indicates completion of the coupling and is arranged on an upper face of the handle grip 11, and a protective resistor 43 are connected in series between a collector of the output transistor 41 and the control power source line 39. When the transistor 41 is turned to ON, the lamp 42 is lit.

The charge line 38 is connected to a light emitting diode 30a of the photointerruptor 30 for detecting a lock action and to a phototransistor 30b. An output transistor 44 is driven reversely by the phototransistor 30b. A lamp 45, which indicates completion of lock and is arranged on the upper face of the handle grip 11, and a protective resistor 46 are connected in series to a collector of the output transistor 44. The lamp 45 is lit when the transistor 44 is turned to ON. The collector of the output transistor 44 is connected to a signal terminal 47 of the connector body 12. A signal from the terminal 47 is conducted through a relay 48 installed in the vehicle to close relay contacts 48a.

Charging of a battery (50) in the electric vehicle by using this embodiment of the supply connector 1 is carried out by the following steps. First, an operator holds the handle grip 11 and contacts the distal end of the connector body 12 with the guide cylinder of the vehicle connector 2. Then, the operator turns the sleeve 19 in the clockwise direction while lightly pushing the entire supply connector 1 toward the vehicle connector 2. The boss 20 on the sleeve 19 enters into and moves in the spiral groove in the vehicle connector 2. Thus, the connector body 12 is drawn into the guide cylinder of the vehicle connector 2, thereby electrically interconnecting the female and male terminals.

Figure 5:
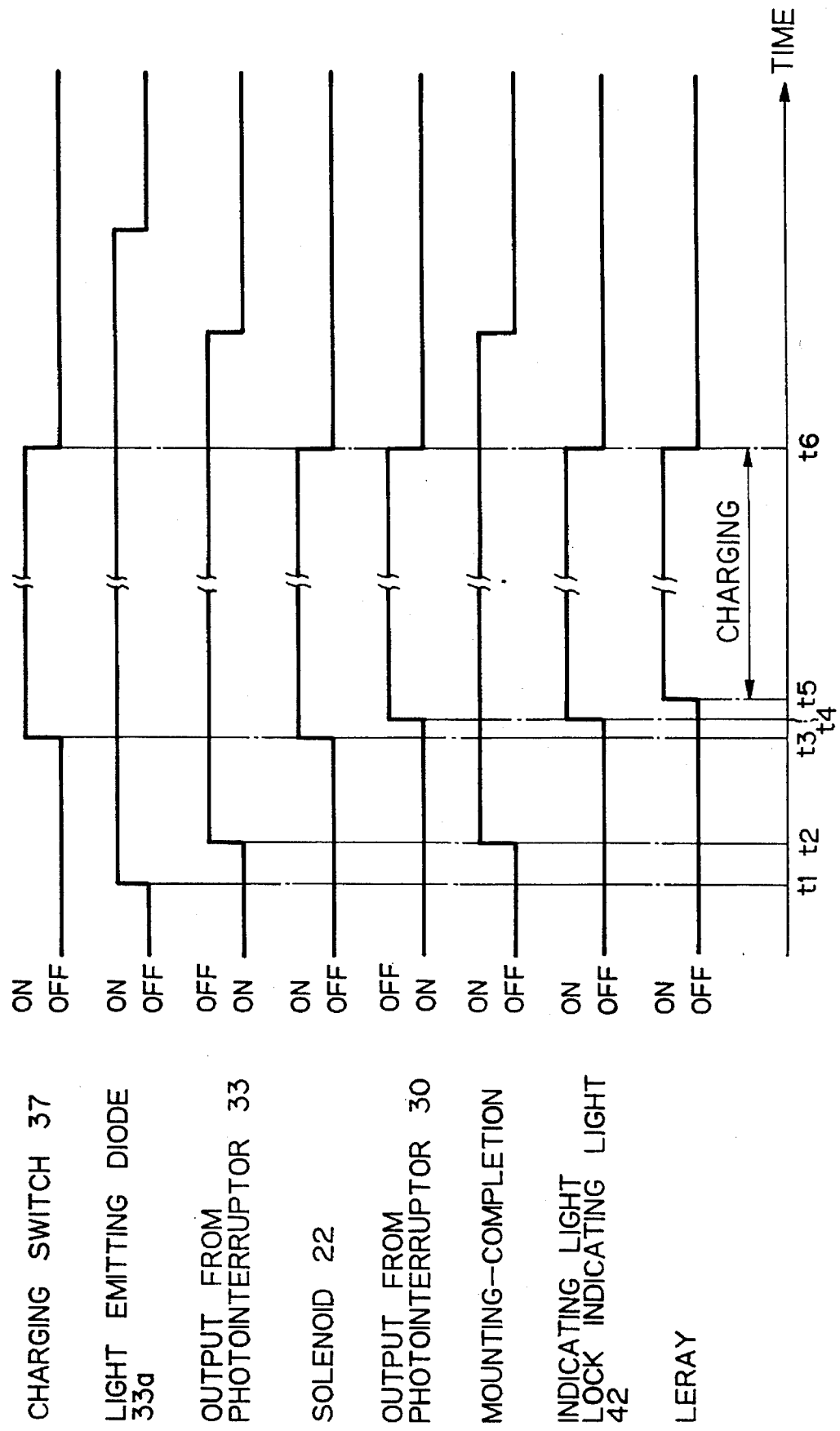
FIG. 5A is a time chart of the lock control circuit.

When the connection detecting terminals 17, 17 are connected to the shorting terminal 18 in the vehicle connector 2, a voltage is applied to the control power source line 39 in the connector body 12, so that the light emitting diode 33a of the photointerruptor 33 for detecting the completion of the coupling is lit (time t1 in FIG. 5). When the sleeve 19 is turned to the complete coupling position so that the supply connector 1 is completely fitted to the vehicle connector 2, the phototransistor 33b of the photointerruptor 33 is turned to OFF and the output transistor 41 is turned to ON, thereby lighting the lamp 42 for indicating the completion of the coupling (time t2 in FIG. 5).

Then, charging is commenced, that is, the charge switch 37 is turned to ON (time t3 in FIG. 5). A voltage is applied to the charge line 38, so that the solenoid 22 is energized, the plunger rod 26 is drawn to insert the distal end of the lock rod 23 into the notch 27 in the distal end of the sleeve 19 and the sleeve 19 is locked to the connector body 12 not to be rotated. Since the sleeve 19 cannot be turned relative to the connector body 12 under this state, it is impossible to detach the supply connector 1 from the vehicle inlet.

Since the douser 26a of the plunger rod 26 enters into the photointerruptor 30 when the plunger rod 26 of the solenoid 22 is drawn to the lock position, the phototransistor 30b is turned to OFF, so that the lamp 45 is lit to indicate a proper lock state (time t4 in FIG. 5). When the phototransistor 30b of the photointerruptor 30 is turned to OFF and the output transistor 44 is turned to ON, the relay 48 in the vehicle connector 2 is energized, so that the relay contacts 48a are closed to supply power to a circuit 50 being charged in the vehicle inlet through the charge line 38, thereby commencing charging (time t5 in FIG. 5).

When charging is complete, the charge switch 37 of the charging device 100 is turned to OFF (time t6 in FIG. 5). Then, the relay 48 is deenergized to stop supplying of power to the circuit (battery) 50 being charged and to deenergized the solenoid 22. Consequently, in the lock mechanism 21, the lock rod 23 is moved to the left in FIG. 2 by the spring 29 to extract the distal end of the lock rod 23 from the notch 27, thereby allowing the sleeve to be rotated. Accordingly, if the operator turns the sleeve 19 in the anticlockwise direction, it is possible to detach the supply connector 1 from the vehicle connector 2.

In this embodiment, after the supply connector 1 is coupled to the vehicle connector 2, when the charge switch 7 is turned to ON, the solenoid 22 is energized to actuate the lock mechanism 21 and the supply connector 1 cannot be detached from the vehicle connector 2 unless the charge switch 37 is turned to OFF.

In particular, the lock mechanism 21 is actuated under a condition in which the supply connector 1 is completely coupled to the vehicle connector 2 (the phototransistor 33b of the photointerruptor 33 is turned to OFF), in addition to a condition in which the charging is started. Thus, even if the charging is started with incomplete coupling, the lock mechanism is not actuated, so that the operator can detect the lock of a complete coupling and remedy the situation.

In this embodiment, when the lock mechanism 21 is properly actuated to lock the sleeve 19, the lock indicating lamp 45 is lit. Thus, it is possible to easily monitor whether or not the lock mechanism 21 is properly actuated.

The present invention should not be limited to the embodiment described above and illustrated in the drawings. For example, the following alternations may be effective:

(1) The lock mechanism which serves to lock the supply connector to the vehicle connector may be a mechanism in which the connector body is clamped by a pair of lock pawls on its opposite sides to prevent extraction. In a coupling accomplished by rotating the entire supply connector to couple it with the vehicle connector, a pin may be inserted into a body of the supply connector to preclude rotation. Any means for precluding detachment of the connector will be applied to various kinds of connector fitting mechanisms.

(2) Means for detecting the complete coupling of the supply connector to the vehicle connector are not limited to the means for detecting the rotation of the sleeve 19 in the embodiment. For example, a detecting terminal provided on the connector body 12 contacts with a terminal provided on the vehicle connector upon completion of the coupling. Also, for example, in a construction wherein the supply connector is coupled with the vehicle connector by engaging pawls, it is possible to detect the complete coupling by detecting displacement of the engaging pawls. Any means for detecting the completed coupling may be applied to various kinds of coupling mechanisms.

(3) Although the lock indicating means are constituted by the lock indicating lamp 45 made of the LED in the above embodiment, a construction wherein a liquid crystal display indicates the state of the lock mechanism by means of characters or pictorial symbols may be employed.

What is claimed is:

1. A supply connector for detachably coupling to a vehicle battery connector to charge a battery of an electric vehicle, comprising:

a supply connector body;

means for detecting an electrical connection between said supply connector and said vehicle battery connector;

means for detecting a complete coupling between said supply connector body and said vehicle battery connector after said electrical connection detecting means has detected said electrical connection;

a lock mechanism for locking and maintaining the complete coupling of said supply connector body to said vehicle battery connector in response to a detected signal of the complete coupling from said complete coupling detecting means and an ON signal from a charge switch in a charging device and releasing the locking of the complete coupling of said supply connector body to said vehicle battery connector in response to an OFF signal from said charge switch; and means for detecting the locking and maintenance of the complete coupling due to actuation of said lock mechanism to generate a signal for closing a circuit and charging the battery in the electric vehicle.

2. A supply connector according to claim 1, wherein said complete coupling detecting means includes means for indicating an operating state of said means and wherein said coupling maintenance detecting means includes means for indicating an operating state of said lock mechanism.

* * * * *